United States Patent [19]

Maness

[11] 4,110,931
[45] Sep. 5, 1978

[54] INSECT BAIT DISPENSING DEVICE
[75] Inventor: John F. Maness, Memphis, Tenn.
[73] Assignee: Cricket Corporation, Ripley, Tenn.
[21] Appl. No.: 739,353
[22] Filed: Nov. 5, 1976
[51] Int. Cl.² ............................................. A01K 97/04
[52] U.S. Cl. ...................................... 43/55; 221/220; 221/309
[58] Field of Search ............... 43/4, 55; 221/220, 307, 221/309

[56] References Cited
U.S. PATENT DOCUMENTS

| | | | |
|---|---|---|---|
| 503,722 | 8/1893 | Lewis et al. | 43/55 |
| 2,857,705 | 10/1958 | Woodcock | 43/55 |
| 3,164,067 | 1/1965 | Hurst | 43/4 |
| 3,308,570 | 3/1967 | Horton | 43/55 |
| 3,541,722 | 11/1970 | Garrison | 43/4 |

Primary Examiner—Clifford D. Crowder

[57] ABSTRACT

A device carried by a fisherman for dispensing live insects, e.g., crickets and the like, used as fish bait. The device includes a bait container for holding a limited supply of the crickets and a bait dispensing head attached to the bait container for facilitating the act of empaling the cricket with a fishhook and for subsequently facilitating a gentle unrestrained removal of the cricket therefrom. The head includes a pair of jaws which entraps the cricket and constrains it as the fishhook is being thrust therethrough. The jaws are movable to an open position which releases the now hooked cricket allowing it to jump free of the dispensing head. The head also includes a movable gate for enabling the dispensing head to effectively constrain various different size crickets selectively therein.

10 Claims, 11 Drawing Figures

INSECT BAIT DISPENSING DEVICE

BACKGROUND OF THE INVENTION

1. Field of the Invention

This invention relates to the field of insect bait dispensing devices.

2. Description of the Prior Art

Probably the most common insect bait container is of the type having a funnel-like top which ends in either a straight sided neck or it might have an annular lip defining the distal end thereof. In either event, the interior of the neck is unobstructed allowing for free discharge of the insects. This type bait container normally incorporates a cork or rubber stopper to prevent unintentional discharge or loss of the insects. The insects used for bait are rather costly and the unintentional loss is not only expensive but is frustrating since the fisherman is noneffective when he is without bait. Usually this nonintentional loss of bait is a result of undue care in replacing the stopper or it is improperly inserted which means that it probably will fall out as the fisherman is engaged in his endeavor. It should also be mentioned, that oftentimes the fisherman is standing in water up to his waist which means that he can't lay any of his gear down while baiting his hook. This obviously aggravates the task of baiting the hook and oftentimes the stopper is simply not replaced, i.e., particularly during those times when the fish are biting actively. Also, these same problems not only apply to women, children, and handicapped persons, but are even more pronounced particularly since these latter groups of fishermen usually refrain from touching the bait with their hands while baiting their fishhook.

SUMMARY OF THE INVENTION

The present invention is directed towards overcoming the disadvantages and problems relative to previous bait dispensing devices, particularly the above-mentioned problems pertaining to the fisherman losing his bait and the problem of injuring or perhaps killing the insect in the process of removing the bait from the dispensing head. The device of the present invention is intended to be carried by a fisherman for dispensing live insects, e.g., crickets and the like, which he uses as fish bait. The device includes a bait container for holding a limited supply of the crickets and a bait dispensing head attached to the bait container for facilitating the act of empaling the cricket with a fishhook and for subsequently facilitating a gentle unrestrained removal of the cricket therefrom. The head includes a pair of jaws which entraps the cricket and constrains it as the fishhook is being thrust therethrough. The jaws are movable to an open position which releases the now hooked cricket allowing it to jump free of the dispensing head. The head also includes a movable gate having a carriage sleeve member movable to infinite positions between a minimum opening position and a maximum opening position for enabling the dispensing head to effectively constrain various different size crickets and the like selectively therein. An important feature of the present invention is that it may alternately comprise the bait dispensing head per se for selective adaptability to typical bait containers normally found among the fishing gear of the present-day fisherman, i.e., the bait dispensing head includes structure for facilitating this adaptability.

DESCRIPTION OF THE PREFERRED EMBODIMENT

Figure 1:
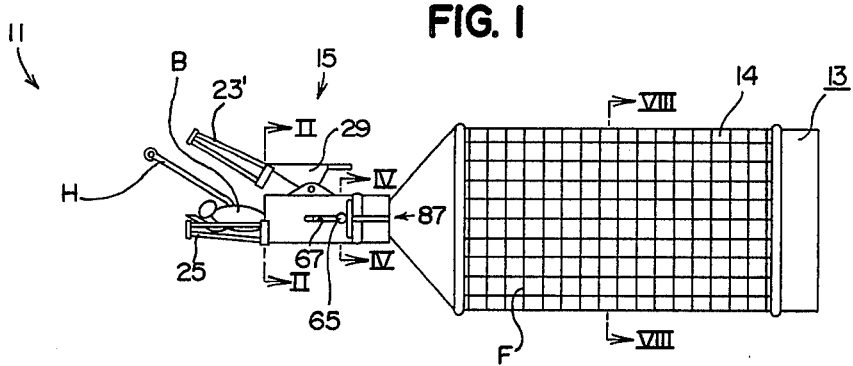
FIG. 1 is a side elevational view of the insect bait dispensing device of the present invention showing the bait dispensing head in an open position to facilitate removing the hooked insect therefrom.

The insect bait dispensing device 11 of the present invention is intended to be carried by a fisherman for dispensing insects, e.g., crickets and the like, which he uses as fish bait characterized herein by the capital letter B. In one embodiment the device 11 includes the combination of a bait container 13 of the type alluded to above and a bait dispensing head 15 attached to the bait container 13 for facilitating the act of empaling the insect or cricket B with a fishhook, characterized herein by the capital letter H, and for subsequently facilitating a gentle unrestrained removal of the empaled cricket B therefrom. The bait container 13 includes a canister 14 preferably formed from screen wire fabric, characterized by the capital letter F, having a multiplicity of interstices for permitting free passage of air therethrough.

The bait dispensing head 15 generally comprises a main body member 17 and solitary cage-like entrapment means 19 defining a distal end 21 of the dispensing head 15 for capturing a single insect or cricket B and constraining the captured cricket B in an optimum position for facilitating thrusting the fishhook H therethrough. The solitary cage-like entrapment means 19 includes a pair of jaw members 23, 25 with at least one of the jaw members, e.g., the jaw member 23, being pivotally attached to the main body member 17 for pivotal movement thereof between a closed position simply characterized by the numeral 23 in FIG. 10 of the drawing and an open position characterized by the numeral 23' depicted in FIG. 1 of the drawing.

The main body member 17 includes a passageway, as at 27, communicating the interior of the bait container 13 with the pair of jaw members 23, 25. The bait dispensing head 15 also includes lever means, as at 29, fixedly attached to the movable jaw member 23 for facilitating manually moving jaw member 23 so that there is relative movement of the pair of jaw members 23, 25 to the open position (23') for unrestraining the hooked insect or cricket B thus enabling it to be gently removed from the solitary cage-like entrapment means 19. In other words, the cricket is not torn or injured in any manner, in fact, in actual practice it has been found that the cricket actually jumps free of the entrapment means 19 immediately after the jaw members 23, 25 are opened. The lever means 29 includes bias means (not shown) for urging the jaws 23, 25 closed.

Figure 8:
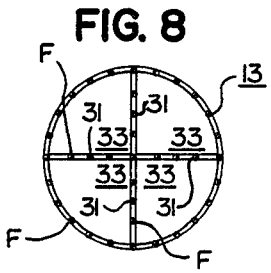
FIG. 8 is a sectional view taken as on the line VIII—VIII of FIG. 1 showing the compartment arrangement of the bait container.

From FIG. 8 of the drawing it may be seen that the bait container 13 of the present invention includes partition means, as at 31, dividing the container 13 into a plurality of compartments 33 each being communicated with the passageway 27 for increasing the area of the interior surface of the bait container 13 upon which the supply of live insects or crickets B may attach themselves thus minimizing their mortality rate by obviating the likelihood of the insects or crickets B clustering one upon the other. The partition means 31 preferably is formed from the same screen wire fabric F as previously described for the canister 14.

Figure 11:
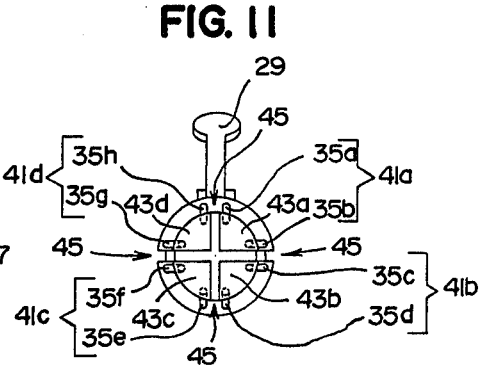
FIG. 11 is an end view of the dispensing head as depicted in FIG. 10 with the view being taken from the left side as viewed in FIG. 10.

The solitary cage-like entrapment means 19 includes a plurality of uniformly spaced apart fingers 35 which are individually designated as 35a, 35b, 35c, etc., circumposed about the passageway 27 and jointly establishing a cage-like extension thereof. The plurality of fingers 35 have proximal and distal ends 37, 39 and are arranged to establish a plurality of groups 41 which are individually designated as 41a, 41b, 41c, etc. as best shown in FIG. 11 of the drawing. The entrapment means 19 also includes a plurality of stopper plug segments 43, individually designated as 43a, 43b, 43c, etc., which are respectively fixedly attached to the distal ends 39 of the groups 41 of fingers 35 for jointly closing off the distal end of the solitary cage-like entrapment means 19.

From FIG. 11 of the drawing it may be seen that the stopper plug segments 43 jointly define spacings therebetween establishing in part uninterrupted channels 45 extending between adjacent ones of the groups 41 of fingers 35 for guidingly constraining the fishhook H and enabling the free passage therethrough of the fishhook H when removing the hooked insect or cricket B from the solitary cage-like entrapment means 19.

Figure 3:
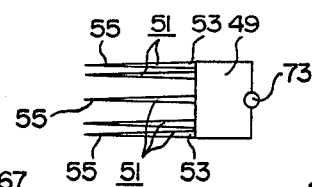
FIG. 3 is a side elevational view of the carriage sleeve member of the present invention as it would appear when totally disassociated from the bait dispensing head.
Figure 4:
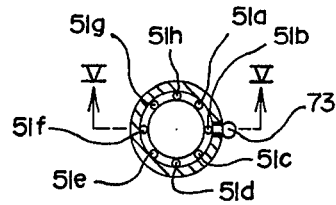
FIG. 4 is a sectional view taken as on the line IV—IV of FIG. 1.
Figure 5:
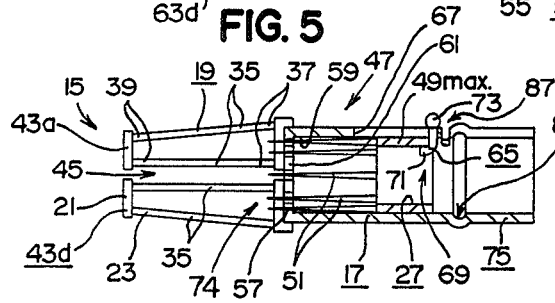
FIG. 5 is a sectional view taken as on the line V—V of FIG. 4 with the device having been rotated 90° about the longitudinal axis thereof and which clearly shows the gate means in a maximum opening position.
Figure 6:
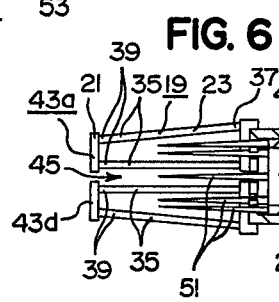
FIG. 6 is a view similar to FIG. 5 with the difference being that the gate means is shown in a minimum opening positions.

The device 11 preferably includes gate means, generally indicated at 47, for varying the size of the solitary cage-like entrapment means 19 to selectively constrain insects or crickets B of various different sizes therein. The gate means 47 includes a carriage sleeve member 49 as best shown in FIGS. 3, 5 and 6 of the drawing and which is slidably received within the passageway 27 for slidable movement to and fro therein. The gate means 47 also includes a plurality of resilient tine members 51, individually designated as 51a, 51b, 51c, etc., which respectively have root portions 53 thereof fixedly attached to the carriage sleeve member 49 with the free ends thereof, as at 55, being directed toward the distal end 21 of the dispensing head 15.

The carriage sleeve member 49 is movable to infinite positions between a minimum opening position characterized by the numeral 49 having the suffix letters "min." as clearly shown in FIG. 6 of the drawing and a maximum opening position characterized by the numeral 49 having the suffix letters "max." and as clearly shown in FIG. 5 of the drawing. The gate means 57 also includes constrictor means, as at 57 and best shown in FIG. 2 of the drawing, which is fixedly attached to the main body member 17 in any well-known manner as by being integrally formed therewith.

The constrictor means 57 is disposed adjacent the distal terminus, as at 59, of the passageway 27 and establishes means for engaging and yieldably urging the free ends 55 of the resilient tine members 51 inwardly toward the longitudinal center line of the passageway 27 as the carriage sleeve member 49 is slidably moved toward the minimum opening position 49 min. (FIG. 6) thus decreasing the effective size of the solitary cage-like entrapment means 19 and conversely increasing the effective size of the solitary cage-like entrapment means 19 as the carriage sleeve member 49 is moved toward the maximum opening position 49 max. (FIG. 5).

Figure 2:
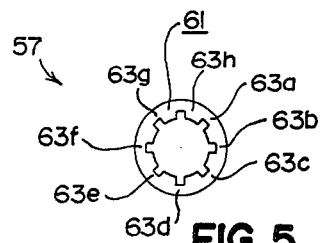
FIG. 2 is a sectional view taken as on the line II—II and which clearly shows the dislike constrictor means of the present invention.

From FIG. 2 of the drawing it may be seen that the constrictor means 57 includes means, for example a disk 61, defining a plurality of notches 63 individually designated as 63a, 63b, 63c, etc., which respectively receive the tine members 51a, 51b, 51c, etc. The diameter of the carriage sleeve member 49 is substantially equal to the spaced apart distance between opposite tine members, e.g., the tine members 51a, 51e, etc. The distance between opposing notches, e.g., the notches 63a, 63e, is slightly less than the diameter of the sleeve member 49 thus achieving the constrictor action as the carriage sleeve member 49 is moved to the left as viewed in FIGS. 5 and 6.

It will be appreciated by those skilled in the art that the greater the difference is between the diameter of the carriage sleeve member 49 and the spaced distance between opposing notches, the more effective the gate means 47 becomes. Therefore, the difference in the size of this structure will be determined by the type of insect and the size variance desirable for the solitary cage-like entrapment means 19. It should also be understood that the length of the tine members 51 may be longer or shorter than that shown in FIGS. 5, 6, and 10 to better conform the solitary cage-like entrapment means 19 to a specific type of insect. Also, the variance depicted in FIG. 5 and 6 for the minimum opening position 49 min. and the maximum opening position 49 max. is intended to simply exemplify the concept thus, numerous different variances in size for the solitary cage-like entrapment means 19 is anticipated.

From FIGS. 1, 5, and 6 of the drawing it may be seen that the device 11 preferably includes sleeve actuator means 65 for manually moving the carriage sleeve member 49 to and fro within the passageway 27. The main body member 17 is provided with an elongated slot 67 opening into the passageway 27. The sleeve actuator means includes linkage means 69 extending through the slot 67 as best shown in FIGS. 5 and 6 of the drawing. More specifically, the linkage means 69 includes an inner portion as at 71 which is fixedly attached to the carriage sleeve member 49 in any well-known manner as by welding or the like. The sleeve actuator means 65 also includes knob means 73 which is fixedly attached in like manner to the outer portion thereof, for manually moving the linkage means 69 to and fro along the slot 67 thus actuating the carriage sleeve member 49.

Particular attention is now directed to FIGS. 2 and 3 of the drawing wherein it may be seen that the distance between opposing notches 63 (FIG. 2) preferably is less than the distance between opposite tine members 51 (FIG. 3), i.e., when the tine members 51 are totally relaxed as shown in FIG. 3. Therefore, the gate means 47 includes ever-acting means 74 for enhancing the effectiveness of the solitary cage-like entrapment means 19 by substantially denying reverse travel of a particular size insect or cricket B through the passageway 27 once admission into the solitary cage-like entrapment means 19 has been gained. On the other hand, movement of the particular size insect or cricket B past the gate means 47 while initially gaining admission into the solitary cage-like entrapment means 19 remains substantially unhindered.

The ever-acting means 74 alluded to above includes providing the plurality of resilient tine members 51, or specifically the free ends thereof 55, with sharp points with the disk 61 acting upon the tine members 51 thus causing them to be continuously converged slightly inwardly toward the longitudinal center line of the passageway 27 irrespectively of the particular positioning of the carriage sleeve member 49, i.e., in the manner previously described. Thusly, the everacting means 74 of the gate means 47 is established. More specifically, the converging sharp pointed ends 55 of the tine members 51 confront the insect thus denying the reverse travel as previously mentioned.

Figure 7:
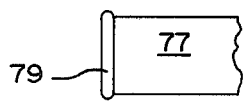
FIG. 7 is a partial view depicting typical neck structure of the distal end of certain prior bait containers.

The main body member 17 preferably includes a base portion 75 for removable engagement with typical neck structure, as at 77 in FIG. 7 of the drawing, of typical bait containers of the type having an annular flared lip, as at 79, defining the distal end of the neck structure 77. The base portion 75 includes an internal annular groove, as at 81, disposed a predetermined distance inwardly from the proximal end of the main body member 17 to selectively receive the annular flared lip 79 for locking the bait dispensing head 15 to the bait container 13 as the neck structure 77 is inserted into the base portion 75.

Figure 10:
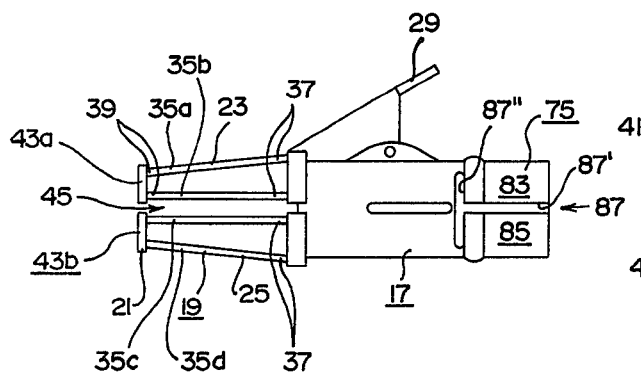
FIG. 10 is a side elevational view of the bait dispensing head per se of the present invention which is intended to be universally adaptable to the neck structure of both of the prior bait containers as depicted in FIGS. 7 and 9.

From FIG. 10 of the drawing it may be seen that the base portion 75 includes tab means 83, 85 defining a tee-shaped slit 87 having a longitudinal median portion 87' extending longitudinally from the proximal end of the main body member 17 and terminating with a lateral portion 87" being disposed adjacent the annular groove 81. The base portion 75 of the main body member 17 is preferably formed from a rather thin resilient metal. Therefore, the tab means 83, 85 are inherently resilient to enable flexible movement thereof as the neck structure 77 (FIG. 7) is inserted into the base portion 75 (FIG. 10) with the flared lip 79 (FIG. 7) snapping into seating engagement with the annular groove 81 (FIGS. 5, 6).

Figure 9:
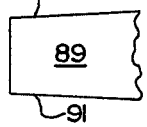
FIG. 9 is a view similar to FIG. 7 depicting the distal end of typical neck structure of another prior bait container.

The base portion 77 is intended to also be adaptable to other typical neck structure, as at 89 in FIG. 9, which is of the type having substantially straight wall structure, as at 91, defining the distal end of the neck structure 89. The resilient tab means 83, 85 as above described provide means for enabling the base 75 to frictionally engage the straight wall structure 91 thus the bait dispensing head 15 may be removably attached to those existing bait containers having neck structure 89 as depicted in FIG. 9.

Although the invention has been described and illustrated with respect to a preferred embodiment thereof, it is to be understood that it is not to be so limited since changes and modifications may be made therein which are within the full intended scope of the invention.

I claim:

1. The combination with a bait container of the type carried by a fisherman for holding a limited supply of live insects which he uses as fish bait, of a bait dispensing head attached to said bait container for facilitating the act of empaling the insect with a fishhook and for subsequently facilitating a gentle unrestrained removal of the empaled insect therefrom, said bait dispensing head comprising a main body member and solitary cage-like entrapment means defining a distal end of said dispensing head for capturing a single insect and constraining the captured insect in an optimum position for facilitating thrusting the fishhook therethrough, said solitary cage-like entrapment means including a pair of jaw members with at least one of said jaw members being pivotally attached to said main body member for pivotal movement thereof between closed and open positions, said main body member including a passageway communicating the interior of said bait container with said pair of jaw members, lever means attached to said movable jaw member for facilitating manually moving said pair of jaw members to the open position for unrestraining the hooked insect thus enabling it to be gently removed from said solitary cage-like entrapment means, and gate means for varying the size of said solitary cage-like entrapment means to selectably constrain insects of various different sizes therein, said gate means including a carriage sleeve member slidably received within said passageway for slidable movement to and fro therein, a plurality of resilient tine members having their root portions fixedly attached to said carriage sleeve member with the free ends thereof being directed toward said distal end of said dispensing head, said carriage sleeve member being movable to infinite positions between a minimum opening position and a maximum opening position, and constrictor means fixedly attached to said main body member and being disposed adjacent the distal terminus of said passageway for engaging and yieldably urging the free ends of said resilient tine members inwardly toward the longitudinal center line of said passageway as said carriage sleeve member is slidably moved toward said minimum opening position thus decreasing the effective size of said solitary cage-like entrapment means and conversely increasing the effective size of said solitary cage-like entrapment means as said carriage sleeve member is moved toward said maximum opening position.

2. The combination as set forth in claim 1 in which is included sleeve actuator means for manually moving said carriage sleeve member to and fro within said passageway, said main body member being provided with an elongated slot opening into said passageway; said sleeve actuator means including linkage means extending through said slot with the inner portion thereof being fixedly attached to said carriage sleeve member, and knob means fixedly attached to the outer portion of said linkage means for manually moving said linkage means to and fro along said slot thus actuating said carriage sleeve member.

3. The combination as set forth in claim 1 in which said plurality of resilient tine members have the free ends thereof provided with sharp points and are disposed so as to be continuously converged slightly inwardly toward the longitudinal center line of said passageway irrespectively of the particular positioning of said carriage sleeve member thus effectively establishing an ever-acting action of said gate means for enhancing the effectiveness of said solitary cage-like entrapment means, said converging sharp pointed ends of said tine members confronting the insect and thus substantially denying its reverse travel through said passageway once admission into said solitary cage-like entrapment means has been gained, yet movement of the proper size insect past the sharp pointed tine members while initially gaining admission into said solitary cage-like entrapment means remains substantially unhindered since the insect does not encounter the sharp pointed ends of said tine members while moving in this direction.

4. The combination with a bait container of the type carried by a fisherman for holding a limited supply of live insects which he uses as fish bait, of a bait dispensing head attached to said bait container for facilitating the act of empaling the insect with a fishhook and for subsequently facilitating a gentle unrestrained removal of the empaled insect therefrom, said bait dispensing head comprising a main body member and solitary cage-like entrapment means defining a distal end of said dispensing head for capturing a single insect and constraining the captured insect in an optimum position for facilitating thrusting the fishhook therethrough, said solitary cage-like entrapment means including a pair of jaw members with at least one of said jaw members being pivotally attached to said main body member for pivotal movement thereof between closed and open positions, said main body member including a passageway communicating the interior of said bait container with said pair of jaw members, lever means attached to said movable jaw member for facilitating manually moving said pair of jaw members to the open position for unrestraining the hooked insect thus enabling it to be gently removed from said solitary cage-like entrapment means, and gate means for varying the size of said solitary cage-like entrapment means to selectably constrain insects of various different sizes therein, said gate means including ever-acting means for enhancing the effectiveness of said solitary cage-like entrapment means by substantially denying reverse travel of a particular size insect through said passageway once admission into said solitary cage-like entrapment means has been gained, yet movement of the particular size insect past said gate means while initially gaining admission into said solitary cage-like entrapment means remains substantially unhindered.

5. A bait dispensing head for attachment to a bait container of the type carried by a fisherman for holding a limited supply of live insects which he uses as fish bait, said bait dispensing head comprising a main body member and solitary cage-like entrapment means defining the distal end of said dispensing head for capturing a single insect and constraining the captured insect in an optimum position for facilitating thrusting a fishhook therethrough, said solitary cage-like entrapment means including a pair of jaw members with at least one of said jaw members being pivotally attached to said main body member for pivotal movement thereof between open and closed positions, said main body member including a passageway for communicating the interior of said bait container with said pair of jaw members, lever means attached to said movable jaw member for facilitating manually moving said pair of jaw members to the open position for unrestraining the hooked insect thus enabling it to be gently removed from said solitary cage-like entrapment means, and gate means for varying the size of said solitary cage-like entrapment means to selectively constrain insects of various different sizes therein, said gate means including a carriage sleeve member slidably received within said passageway for slidable movement to and fro therein, a plurality of resilient tine members having their root portions fixedly attached to said carriage sleeve member with the free ends thereof being directed toward said distal end of said dispensing head, said carriage sleeve member being movable to infinite positions between a minimum opening position and a maximum opening position, and constrictor means fixedly attached to said main body member and being disposed adjacent the distal terminus of said passageway for engaging and yieldably urging the free ends of said resilient tine members inwardly toward the longitudinal centerline of said passageway as said carriage sleeve member is slidably moved toward said minimum opening position thus decreasing the effective size of said solitary cage-like entrapment means and conversely increasing the effective size of said solitary cage-like entrapment means as said carriage sleeve member is moved toward said maximum opening position.

6. The bait dispensing head as set forth in claim 5 in which is included sleeve actuator means for manually moving said carriage sleeve member to and fro within said passageway, said main body member being provided with an elongated slot opening into said passageway; said sleeve actuator means including linkage means extending through said slot with the inner portion thereof being fixedly attached to said carriage sleeve member, and knob means fixedly attached to the outer portion of said linkage means for manually moving said linkage means to and fro along said slot thus actuating said carriage sleeve member.

7. The bait dispensing head as set forth in claim 5 in which said plurality of resilient tine members have the free ends thereof provided with sharp points and are disposed so as to be continuously converged slightly inwardly toward the longitudinal center line of said passageway irrespectively of the particular positioning of said carriage sleeve member thus effectively establishing an ever-acting action of said gate means for enhancing the effectiveness of said solitary cage-like entrapment means, said converging sharp pointed ends of said tine members confronting the insect and thus substantially denying its reverse travel through said passageway once admission into said solitary cage-like entrapment means has been gained, yet movement of the proper size insect past the sharp pointed tine members while initially gaining admission into said solitary cage-like entrapment means remains substantially unhindered since the insect does not encounter the sharp pointed ends of said tine member while moving in this direction.

8. A bait dispensing head for attachment to a bait container of the type carried by a fisherman for holding a limited supply of live insects which he uses as fish bait, said bait dispensing head comprising a main body member and solitary cage-like entrapment means defining the distal end of said dispensing head for capturing a single insect and constraining the captured insect in an optimum position for facilitating thrusting a fishhook therethrough, said solitary cage-like entrapment means including a pair of jaw members with at least one of said jaw members being pivotally attached to said main body member for pivotal movement thereof between open and closed positions, said main body member including a passageway for communicating the interior of said bait container with said pair of jaw members, lever means attached to said movable jaw member for facilitating manually moving said pair of jaw members to the open position for unrestraining the hooked insect thus enabling it to be gently removed from said solitary cage-like entrapment means, and gate means for varying the size of said solitary cage-like entrapment means to selectively constrain insects of various different sizes therein, said gate means including everacting means for enhancing the effectiveness of said solitary cage-like entrapment means by substantially denying reverse travel of a particular size insect through said passageway once admission into said solitary cage-like entrapment means has been gained, yet movement of the particular size insect past said gate means while initially gaining admission into said solitary cage-like entrapment means remains substantially unhindered.

9. A bait dispensing head for attachment to a bait container of the type carried by a fisherman for holding a limited supply of live insects which he uses as fish bait, said bait dispensing head comprising a main body member and solitary cage-like entrapment means defining the distal end of said dispensing head for capturing a single insect and constraining the captured insect in an optimum position for facilitating thrusting a fishhook therethrough, said solitary cage-like entrapment means including a pair of jaw members with at least one of said jaw members being pivotally attached to said main body member for pivotal movement thereof between open and closed positions, said main body member including a passagway for communicating the interior of said bait container with said pair of jaw members, and lever means attached to said movable jaw member for facilitating manually moving said pair of jaw members to the open position for unrestraining the hooked insect thus enabling it to be gently removed from said solitary cage-like entrapment means, said main body member including a base portion for removable engagement with typical neck structure of said bait container of the type having an annular flared lip defining the distal end of said neck structure, said base portion including an internal annular groove disposed a predetermined distance inwardly from the proximal end of said main body member to selectively receive said annular flared lip for locking said bait dispensing heat to said bait container as said neck structure is inserted into said base portion, said base portion including tab means defining a tee-shaped slit having a longitudinal median portion extending longitudinally from the proximal end of said main body member and terminating with a lateral portion disposed adjacent said annular groove, said tab means being inherently resilient to enable flexible movement thereof as said neck structure is inserted into said base portion with said flared lip snapping into seating engagement with said annular groove.

10. A bait dispensing head of attachment to a bait container of the type carried by a fisherman for holding a limited supply of live insects which he uses as fish bait, said bait dispensing head comprising a main body member and solitary cage-like entrapment means defining the distal end of said dispensing head for capturing a single insect and constraining the captured insect in an optimum position for facilitating thrusting a fishhook therethrough, said solitary cage-like entrapment means including a pair of jaw members with at least one of said jaw members being pivotally attached to said main body member for pivotal movement thereof between open and closed positions, said main body member including a passageway for communicating the interior of said bait container with said pair of jaw members, and lever means attached to said movable jaw member for facilitating manually moving said pair of jaw members to the open position for unrestraining the hooked insect thus enabling it to be gently removed from said solitary cage-like entrapment means, said main body member including a base portion for removable engagement with typical neck structure of said bait container of the type having substantially straight wall structure defining the distal end of said neck structure, said base portion including tab means defining the tee-shaped slit extending longitudinally from the proximal end of said main body member and terminating a predetermined distance toward said distal end thereof, said tab means being inherently resilient to enable flexible movement thereof as said neck portion is inserted into said base portion with said tab means providing means for enabling said base portion to frictionally engage said straight wall structure of said neck structure, thus said bait dispensing head may be removably attached to said bait container.

* * * * *